United States Patent [19]
Kirkland

[11] 3,983,750
[45] Oct. 5, 1976

[54] FLUID LEVEL SENSING DEVICE

[75] Inventor: James L. Kirkland, 2211 Lombardy Ave., Panama City, Fla. 32401

[73] Assignee: The United States of America as represented by the Secretary of the Navy, Washington, D.C.

[22] Filed: Sept. 29, 1975

[21] Appl. No.: 617,609

[52] U.S. Cl. .............................. 73/170 A; 73/290 R
[51] Int. Cl.$^2$ ......................................... G01F 23/28
[58] Field of Search ..................... 73/170 A, 290 R

[56] References Cited
UNITED STATES PATENTS
2,869,108  1/1959  Smith .............................. 73/170 A FOREIGN PATENTS OR APPLICATIONS
1,223,769  3/1971  United Kingdom ............... 73/290 R Primary Examiner—James J. Gill
Assistant Examiner—Anthony V. Ciarlante
Attorney, Agent, or Firm—Richard S. Sciascia; Don D. Doty; Harvey A. David

[57] ABSTRACT

A water wave height and fluid level measuring system is disclosed as having a buoyant support mast which floats partially above water and partially below water in a substantially vertical disposition. A radio frequency transmitter is mounted on said mast above said water, and a plurality of radio frequency receivers are mounted on said mast at spatially disposed positions along said mast and submerged within said water. Telemetering, receiving data processing, and readout means are effectively connected to said receivers for communicating the output signals therefrom to predetermined remote or other locations, with said output signals being analog signals which represent water wave height or other fluid level at any given instant.

11 Claims, 7 Drawing Figures

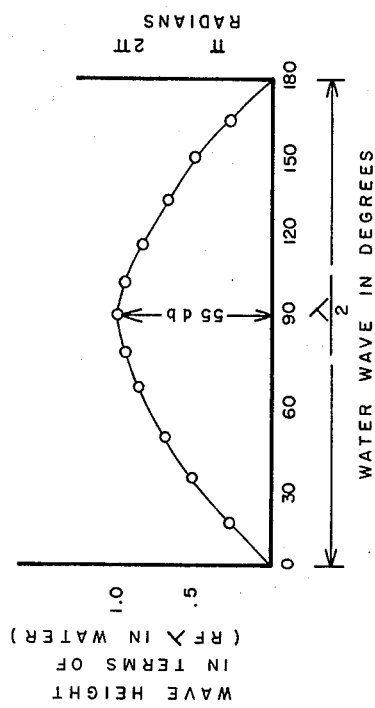
Fig. 6
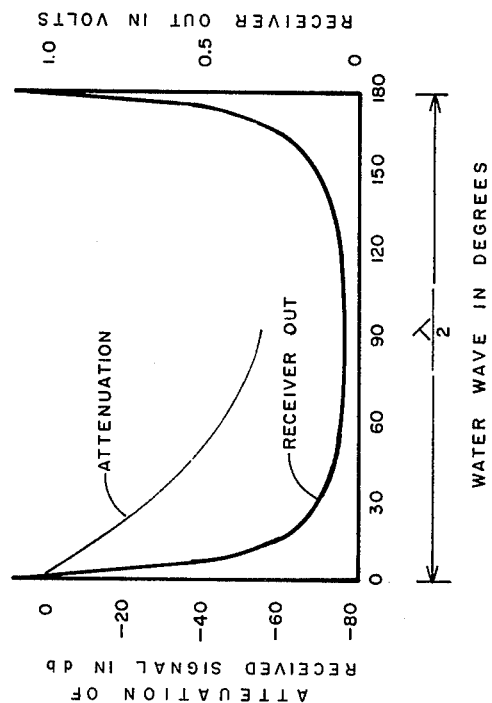
Fig. 7
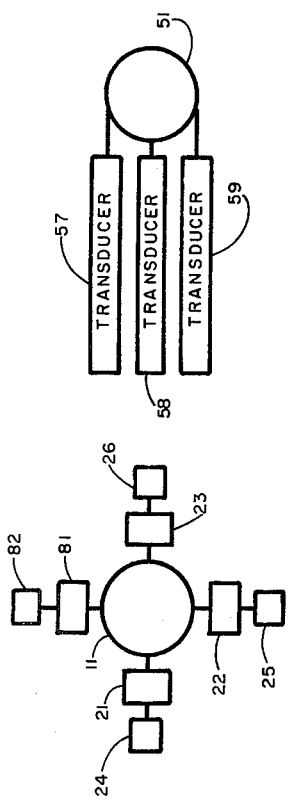
Fig. 3
Fig. 4
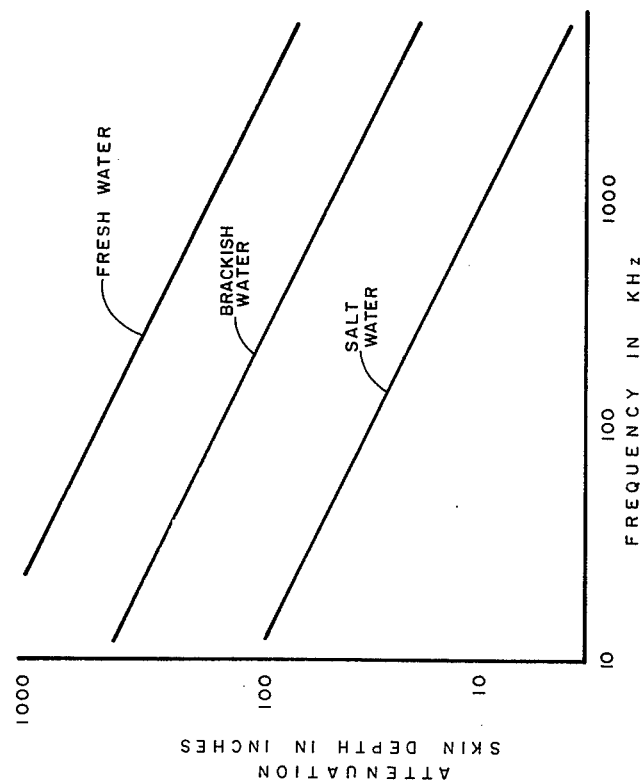
Fig. 5

FLUID LEVEL SENSING DEVICE

STATEMENT OF GOVERNMENT INTEREST

The invention described herein may be manufactured and used by or for the Government of the United States of America for governmental purposes without the payment of any royalties thereon or therefor.

FIELD OF THE INVENTION

The present invention relates, in general, to oceanographic instrumentation, and, in particular, is a device for measuring the height of ocean waves and other fluid levels.

DESCRIPTION OF THE PRIOR ART

Heretofore, a number of methods and means have been employed to measure wave height. For example, electro-pressure responsive devices have been deployed on the sea floor and the variation of water pressure sensed thereby as a wave passed thereover. In such case, the higher the wave, the greater the pressure thereon; and as a consequence, the greater the analog electrical signal produced thereby. Of course, the reading out of said analog signal on a time basis presented an indication of wave height of any given instant.

Another method and means for measuring wave height involved using a sonar system for echo-ranging the distance between a sonar of known position and the surface of the water as a consequence of broadcasting sonic energy toward the water an air interface and timely receiving an echo therefrom the to-and-fro transit time of which is proportional to the wave height at any given instant.

The former device leaves something to be desired because causes other than waves contribute to sea pressure changes, and because the pressure changes due to wave action are rapidly attenuated with increasing depth. The latter mentioned sonar system requires sophisicated electronic equipment, the complexity of which is ordinarily excessive for the subject purpose, thereby being inordinately costly, as well. Hence, it may be seen that the lack of accuracy and cost of the aforesaid prior art devices leaves room for a device that constitutes an improvement thereover, viz., the instant invention.

SUMMARY OF THE INVENTION

The subject invention overcomes some of the disadvantages of the prior art, in that it is, relatively speaking, more accurate, more readily deployed as a unitary device, and probably more economical to operate and maintain. In any event, the subject invention ostensively fulfills a need that heretofore has been unavailable.

It is, therefore, an object of this invention to provide an improved water wave height measuring instrument.

Another object of this invention is to provide an electromagnetic wave meter.

Still another object of this invention is to provide a remote automatic water wave height measuring method and means.

A further object of this invention is to provide a relatively inexpensive, self-contained, and expendable wave height meter that is easily deployed and operated in both deep and shallow water.

A further object of this invention is to provide an improved method and means for measuring the electrical conductivity of water, water wave height, and water depth that may be deployed easily by freely dropping it from an aircraft, boat, ship, submarine vehicle, or the like.

Another object of this invention is to provide an improved wave meter that may be deployed and operated, either directly or remotely, regardless of weather conditions.

Another object of this invention is to provide an improved wave height and tide measuring instrument that is independent of water depth and whose acquired and measured data may be telemetered to a remote mobile or stationary place for the data processing thereof with greater comfort and convenience.

Still another object of this invention is to provide an improved method and means for measuring and signaling the depth of water or other fluids.

Another object of this invention is to provide an improved water wave and depth measuring instrument that has no moving parts and is essentially immune to fouling by spurious ambient objects or matter.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 3 discloses an exemplary receiver and receiving transducer array that may be employed in the species of both FIGS. 1 and 2, if so desired;

FIG. 4 discloses another exemplary receiver and receiving transducer array that may be used in conjunction with the species of the invention shown in FIGS. 1 and 2;

FIG. 5 shows a graphical representation of various water curves obtained when skin depth is plotted against frequency therefor;

FIG. 6 graphically illustrates water wave height in terms of water wave length;

FIG. 7 graphically shows received signal attenuation and received signal in db and volts, respectively in terms of water wave length, both of which are correlated with the parameters shown in FIG. 6.

DESCRIPTION OF THE PREFERRED EMBODIMENTS

Figure 1:
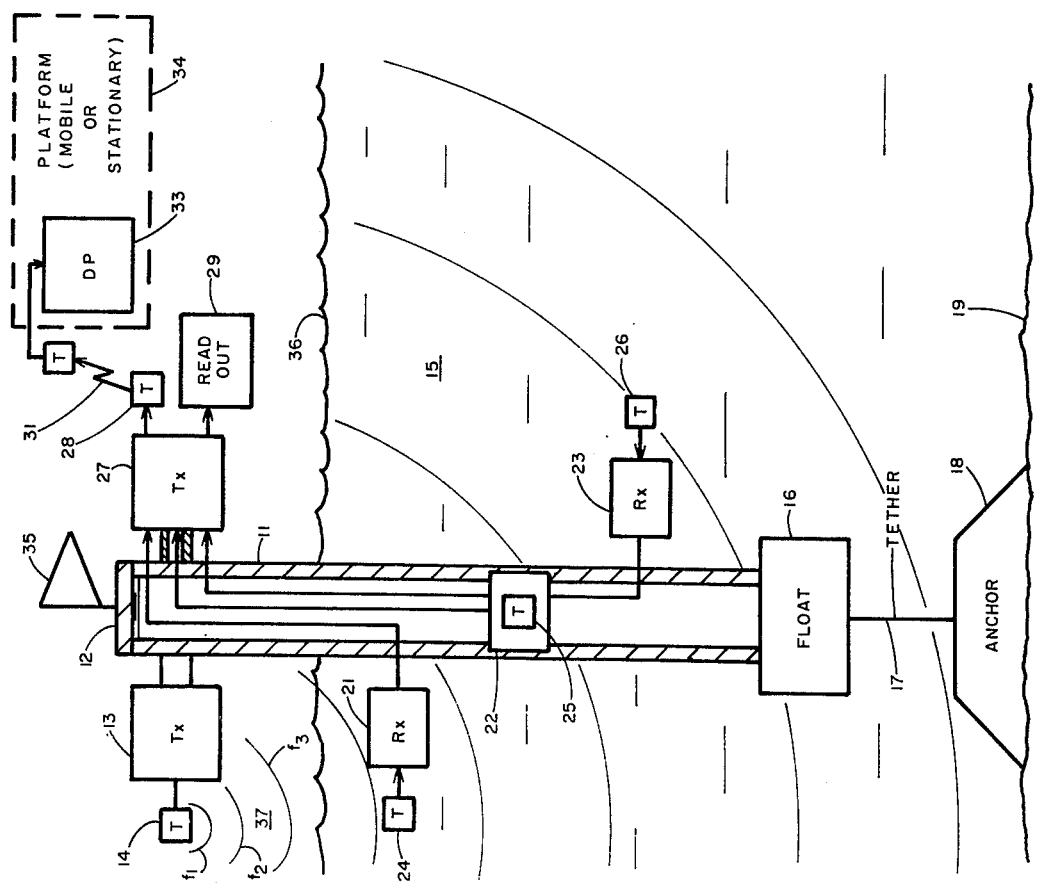
FIG. 1 depicts a preferred embodiment of the water wave height measuring instrument constituting the subject invention.

Referring now to FIG. 1, there is shown a hollow, pipelike, boom, mast, or spar 11 which has a removable end cap 12 at the top thereof that may be held in place by suitable screw threads or any other conventional connection means. Attached to spar 11 is a multifrequency radio transmitter 13 that is capable of energizing a suitable transducer 14—such as an antenna or the like—so as to effect the timely broadcast of a plurality of different radio frequency electromagnetic signals $f_1$, $f_2$, and $f_3$ in a downwardly direction.

Spar 11 is deployed in water 15, the wave heights of which are to be measured, and at the bottom thereof a buoyant float is connected in such manner as to hold spar 11 erect in a substantially vertical position. To further facilitate the proper holding and positioning of spar 11, a cable or other tether 17 is connected between the bottom of float 16 and an anchor or weight 18 sitting on the water floor 19. Of course, if so desired, spar 11 could be a piling which has been driven into the sea floor.

As would be obvious to the artisan, spar 11 need not be hollow but, instead, may be solid, if so desired.

A plurality of radio receivers 21, 22, and 23 are connected to spar 11 at predetermined increments of lengths thereof and around the periphery thereof in a somewhat helical configuration, thereby effectively decoupling them relative to each other. Respectively connected to said receivers 21, 22, and 23 are a like plurality of receiving transducers 24, 25, and 26—such as antennas, coils, loops, or the like—which are capable of receiving the aforementioned plurality of radio signal frequencies, respectively. For example, transducer 24 should be designed to optimumly receive a first radio frequency, transducer 25 a second radio frequency, and 26 a third radio frequency. Likewise, radio receivers 21, 22, and 23 should be designed to receive only said first, second, and third radio signals, respectively.

Although only a trio of receivers and receiving transducers are disclosed in this instance, it should be understood that any number thereof may be used without violating the spirit and scope of the invention; moreover, they may be spaced at any desired distance apart and have any suitable configuration along the length of spar 11. The only prerequisite therefor is that they all be connected to spar 11 in such manner that some thereof are located under water and some thereof are located above water during the passing of a water wave. Of course, the number thereof along the length of spar 11 would be determined by the maximum wave height to be measured at any given time and place.

The outputs of radio receivers 21, 22, and 23 are connected to the respective inputs of a multifrequency transmitter 27, which, in turn, has the output thereof connected to a suitable transmitting transducer 28 and optionally to an appropriate readout 29.

Transmitter 27 and transducer 28 effect the broadcast of the signals received by the aforesaid receivers 21, 22, and 23 by means of one or more signals to a receiving transducer 32, the output of which is connected to the input of a receiving data processor 33 or other radio receiver or utilization apparatus (not shown), with both said transducer 32 and data processor 33 being mounted on some remote platform 34, the latter of which may be mobile or stationary, as the case may be.

Platform 34 could obviously be many different things: a ship, an aircraft, a submarine boat, or suitable land location. It could even be a man made satellite that is circling the earth in space, which is designed as a relay station of some distant place where another radio receiver is located.

A signaling device, such as a flag 35 is preferably mounted on the top of staff or spar 11, so that the subject wave height measuring instrument may be located visually from a distance, say, by someone flying in an aircraft or cruising in a boat. Of course, flag 35 could be replaced with an electronic signal transmitting device—such as a beeper—which would facilitate the homing in thereon, even though the instrument is not within visual range. Obviously, it would be well within the purview of one skilled in the art having the benefit of the teachings presented herewith to select whatever instrument location aid would be most advantageous for any given operational circumstances.

As may be seen from FIG. 1, the preferred embodiment shown therein is securely anchored to the bottom or floor 19 of the waterway involved. Furthermore, it may be seen that the design of spar 11, float 16, tether 17, and anchor 18 are such that permits the entire instrument to float in such manner that transmitter 13 and transmitting transducer 14 are always located above the surface 36 of water 15, regardless of how high the waves are therein. Hence, radio signals $f_1$, $f_2$, and $f_3$ are initially broadcast through the ambient atmosphere 37 and, as will be discussed more fully during the explanation of the invention presented subsequently, so that they will be received by one or more of radio receivers 21, 22, 23 (and perhaps others, if additional receiver means are used) whenever the surface 36 of water 15 uncovers their respective receiving transducers (antennas) 24, 25, and 26, due to water wave or tidal action.

At this time, it would perhaps be noteworthy that broadcast signal frequencies, $f_1$, $f_2$, $f_3$, etc., as the case may be, could be replaced by a single radio signal frequency ($f_s$), if so desired. In such case, however, receivers 21, 22, and 23 would have to be tuned to receive only such single signal frequency, regardless of what it may be. Of course, in all cases—that is, with respect to $f_1$, $f_2$, $f_3$, and $f_s$—the frequencies of the broadcast signal or signals should preferably be optimized by selecting those that have the proper attenuation characteristics for the type of fluid, liquid, water, sea water, or the like, whose level or wave height is being measured.

Figure 2:
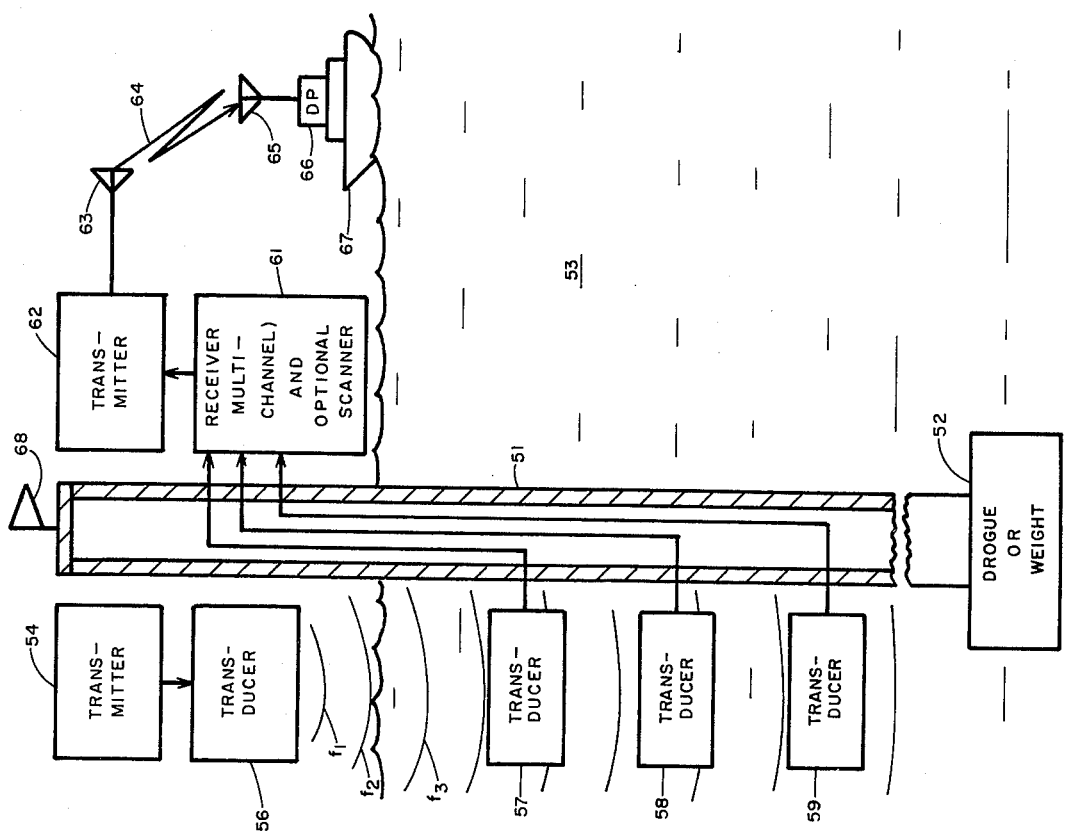
FIG. 2 illustrates a driftable species of the instant invention.

The preferred embodiment of the invention shown in FIG. 2 is similar to that of FIG. 1 in some respects and different therefrom in some respects. In this particular species of the invention, a staff or spar 51 is shown as having a drogue or weight 52 attached thereto in such manner as to cause spar 51 to free—in water 53 in a substantially vertical position and, even more importantly, to do so without any substantial vertical motion due to wave action. Therefore, spar 51 should be of sufficient length, be of sufficient weight, be of sufficient configuration to be substantially immovable due to its own momentum with respect to the water or fluid ambient thereto. In some instances, drogue 52 may be replaced by a sea anchor or other means that will allow the entire instrument to maintain its position relative to the earth, regardless of wave action ambient thereto. Only one such means has been disclosed herein, in order to keep this disclosure as brief as possible, nevertheless, the artisan may select and employ other stabilizing means, in the event circumstances so warrant.

A transmitter 54 is connected to staff 51 near the top thereof and above the surface 55 of water 53. A transmitting transducer 56 (of any suitable type to broadcast radio signals $f_1$, $f_2$, and $f_3$ at the proper frequencies) is connected to the output of transmitter 54.

A plurality of radio signal receiving transducers 57, 58, and 59 are attached to staff 51 at various predetermined distances downwardly and along the length thereof in such manner that they will be properly uncovered by the water wave action to be measured.

The outputs of receiving transducers 57, 58, and 59 are connected to the respective frequency channels of a multichannel receiver and scanner 61 for signal processing therein to a more useful form and level, after which they are supplied to a transmitter 62, connected to the output thereof. An antenna 63 or other transmitting transducer is connected to the output of transmitter 62, and it broadcasts one or more signals 64 representing the signals received by the aforementioned radio receivers 57, 58, and 59 to a receiving antenna 65 that is connected to another radio receiving and data processing receiver 66 located at some remote position.

In this particular embodiment, data processing receiver 66 and antenna 65 are shown as being mounted on a ship 67 that is floating on water 53; however, it should be understood that they may be located on any suitable mobile or stationary platform means, such as, for example, on an aircraft, spacecraft, landcraft, or even on land itself, which would optimize the operation of the invention during any given situation.

Like the embodiment of FIG. 1, the embodiment of FIG. 2 may incorporate a visual sighting means—such as flag 68—or any other device which would enable it to be hunted electronically or otherwise and found in an expeditious manner.

In the event only one radio frequency signal is broadcast by the transmitting means of either of the preferred embodiments of the invention disclosed herewith, the receiving means thereof must be properly keyed to its specific physical location in some manner. Since such keying could be accomplished in many ways, the design choice of which would be well within the purview of the artisan; thus, it should suffice at this time to say that the outputs of said receiver means could be scanned, signal coded by modulation, or received respectively by individual receiving means, and telecommunicated by separate or coded wires or other telemetering means. Of course, each receiving means output signals could also be read out by its own channel in an oscillograph or other multichannel readout means or, for example, by a keyed light array.

FIG. 3 depicts an abridged top view of a possible arrangement of the receiver and receiving transducer elements of the embodiment of the invention shown in FIG. 1. Hence, the same reference numerals, as appropriate, are used therein for similar or like parts. Also in FIG. 3, another set of receiver and receiving transducers, respectively referenced by numerals 81 and 82, are shown to make a more concentric assembly thereof. Of course, as previously suggested any number of sets of such elements may be used and their arrangement around and along staff 11 may be varied by the artisan to suit the occasion.

FIG. 4 illustrates an abridged top view of a possible arrangement of receiver and receiving transducer elements of the embodiment of the invention shown in FIG. 2. Hence, again, the same reference numerals are employed for similar or like parts. Once again, only three receiving transducer elements (antennas) have been shown; however, as many as would be desirable during any given operational circumstance may be used, and, of course, they may be mounted along and around staff 51 in whatever manner would optimize their operations. For instance, they could be deployed in such manner as to have the array configuration shown in FIGS. 1 and 3 and vice versa.

THEORY OF OPERATION

It has long been known that electromagnetic energy is rapidly attenuated in water, and the higher the frequency the greater the attenuation. Thus, when radio frequency signals are directed toward and impinge upon a water surface, they are attenuated rapidly as they attempt to penetrate deeper and deeper into the water. As a matter of fact, such signals are attenuated about 55 db per wavelength thereof or about 8.7 db per skin depth. In this particular instance, one skin depth may be defined as being that water depth which attenuates the radio frequency signal to $1/e$ of its former value (or approximately 8.7 db). Mathematically, it may be expressed as:

$$\delta = \frac{20}{\sqrt{\sigma f}}, \qquad (1)$$

where
$\delta$ = one skin depth in inches,
$\sigma$ = electrical conductivity in water in mho/m,
$f$ = frequency of the radio signal in MHz.

Of course, because the electrical conductivity of water ($\sigma$) varies with the type of water, the skin depth parameter varies accordingly. Hence, when equation (1) is plotted for fresh water, brackish water, and salt water, the graphical representation thereof appears similar to the curves therefor illustrated in FIG. 5. Thus, from FIG. 5, such selection of radio signal frequency may be made which will provide optimum attenuation thereof for circumstances where it is intended to broadcast electromagnetic energy through water for the purpose of its being attenuated thereby, whether the water be fresh water, brackish water, or salt water.

With respect to the subject invention, if it is assumed that the receiving transducers are small—that is, antennas that are loops of the order of two inches in diameter and one-half inch long—it would ostensively be desirable that they not be spaced over six inches apart long the lengths of their supporting staff. Furthermore, since it has been determined to be desirable to have at least 8.7 db attenuation per inch of water level change, the radio frequency required for the top but underwater receiving transducer would be about 100 MHz in salt water having an electrical conductance of 4 mho/m. Obviously, if less accuracy or resolution can be tolerated during any given wave height measuring situation the broadcast radio signal may have a lower frequency.

FIG. 6 shows an approximate waveform that may be generated by a sinusodial ocean wave covering and uncovering a single submerged receiver. Corresponding thereto, the curves of FIG. 7 disclose both received signal attenuation and receiver voltage out at any given instant of the wave of FIG. 6, as measured along identical abscissor defined as being the water wave ($\lambda/2$) in degrees for one-half of the wavelength of said water wave. For the sake of simplicity of disclosure, the readings in both FIGS. 6 and 7 are approximations only, based on a point source transmitter irradiating a point source receiver along a ray and do not take into account contributions that would be made by many of such rays at diverging angles while, at the same time, traveling their respective attenuable paths.

Referring now to FIG. 6, as the water wave passes over a receiver, the depth of the water changes. This is substantially the same as having a "standing wave" of radio frequency (RF) shielding material with the radio receiver moving from left to right underneath it. At the 0° position, the receiver is completely uncovered and, therefore, receives the full signal from the radio transmitter. At, say, a 60° position, the transmitted RF signal would be attenuated because of the depth of water above it. This shielding effect is about that amount arising from the theoretical 50 db per λ of the radio signal in water. Hence, to estimate how much RF signal will be attenuated at the 60° position, the portion of a wavelength (λ) for the water depth is calculated, since one is proportional to the other. Assuming the water wave to be sinusoidal, the height at 60° would be 0.866 of maximum.

Theoretically, the greatest shielding for a given RF wavelength in water would occur at the λ equals the 90° position. For convenience, the high thereof has been chosen to be one wavelength of the operating RF frequency, and the remainder of the curve plotted accordingly. Thus, it may readily be seen that the resulting curve of FIG. 6 defines wave height in terms of water wave length divided by 2, or, in the alternative, in terms of radians per water wave length divided by 2.

As previously suggested, the curves of FIG. 7 may be plotted for the water wave plotted in FIG. 6. Hence, the RF attenuation in db is shown to become greater as the water wave passes over a receiver with the height thereof getting greater between 0° and 90°. And, in addition, as a result of such attenuation, the receiver output becomes less (in terms of volts) as the height of the wave thereover increases between 0° and 90° and then increases as the height of the wave thereover decreases between 90° and 180°.

In view of the foregoing, it may readily be seen that such physical characteristics of water waves and radio frequency signals may be used to provide an on-off or other analog signal that represents water wave height at any given instant. The instant invention accomplishes such results, once it is properly deployed in a known type of water or other fluid, and once it is properly calibrated therein.

MODE OF OPERATION

The operation of the invention is very simple but nevertheless effective. The subject instrument is deployed in the water by mounting or dropping it therein, as shown in FIGS. 1 and 2.

In the species of FIG. 1, transmitter 13 and transducer 14 broadcast three (or more) RF signals toward rceivers 21, 22, and 23 and their respective receiving transducers, the latter of which are tuned to receive one of said RF signals, respectively. Those receivers which are uncovered receive their tuned signal and those that are covered by water do not. Wave height is, thus, sensed thereby because the height thereof is proportional to the number of receivers uncovered (or covered, as the case may be). The uncovered receivers then supply an indication that they are receiving their broadcast RF signals to transmitter 27 which, either telemeters the information to remotely disposed receiving data processor 33 or supplies it to readout 29 for indication thereof thereat.

At this time, it should be understood that the RF signal broadcast by transmitter 13 and transducer 14 may be three or more frequencies, may be a frequency modulated signal, may be a single frequency signal as long as the receivers are tuned accordingly, or may be an amplitude modulated carrier signal with modulation frequecies corresponding to wave height.

The wave sensor of FIG. 2 operates essentially in the same manner as that of FIG. 1, with the exception that it is a self-contained, free-floating unit that is not anchored to the sea floor. As mentioned above, this species must be designed to have a large moment of inertia relative to the water within which it is deployed. A long buoyant staff 51 and perhaps of a drogue or weight at the bottom thereof permits such situation to exist.

As also may be seen, the wave height sensor of FIG. 2 has only its receiving transducers in the water, and its cooperating receiver or receivers (and scanner, if used) are located out of the water. Although such arrangement is operable, it has been determined that both the receiving transducers and the receivers are subject to less electrical noise when they are submerged in water. Of course, the receivers, per se, may be properly shielded therefrom in either case, if so desired, by some appropriate conventional shielding means.

In all probability the device of FIG. 1 would be slightly more accurate than the device of FIG. 2 because its staff would be more securely positioned relative to the water ambient thereto. On the other hand, the device of FIG. 2 would be more versatile from a deployment standpoint. In either case, a more accurate method and means of measuring water wave heights, appropriate liquid levels, etc., are available which advances the state of the art.

If so desired, without violating the scope of the invention, the transmitters and receivers may be reversed in position and, thus, reversed in operation, as well. So doing could possibly result in a more clandestine or covert deployment and operation if such reversed system were properly designed therefor. Of course, the reversing or otherwise rearranging the transmitting means, the receiving means, and any of the other elements associated therewith for any given purpose or operational situation would be well within the purview of the artisan having the benefit of the teachings presented herewith.

Moreover, if so desired, the telemetering and communicating functions may incorporate solid, hard, electrical conductors, coax cables, or the like, in the event so doing would facilitate remote readout and data processing operations.

Obviously, other modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A fluid height measuring system comprising in combination: an elongated support means adapted for floating in the fluid the height of which is to be measured, with one end thereof extending out of said fluid, and with the other end thereof submerged therein;

means mounted on that end of said elongaged support means extending out of said fluid for broadcasting radio frequency energy comprising a plurality of radio frequency signals toward the surface of said fluid;

a plurality of receiving means for receiving the radio frequency energy broadcast by the aforesaid broadcasting means mounted on said elongated support means at predetermined locations along the length thereof that is submerged within said fluid, respectively, each of said receiving means being tuned to receive a different one of said plurality of radio frequency signals; and means effectively connected to the outputs of said plurality of receiving means for indicating when each receiving means of said plurality of rceceiving means receives the radio frequency energy broadcast by said broadcasting means and the received strengths thereof at any given instant simultaneously.

2. The fluid height measuring system of claim 1, wherein said means mounted on that end of said elongated support means extending out of said fluid for broadcasting radio frequency energy toward the surface of said fluid comprises:
a transmitter; and
a transmitting transducer connected to the output of said transmitter.

3. The fluid height measuring system of claim 1, wherein each of said plurality of means for receiving the radio frequency energy broadcast by the aforesaid broadcasting means mounted on said elongated support means a predetermined locations along the length thereof that is submerged within said fluid comprises:
a receiving transducer; and
a receiver connected to the output of said receiving transducer.

4. The fluid height measuring system of claim 1, wherein each of said radio frequency signals comprises:
a carrier wave; and
a predetermined frequency modulating signal superimposed upon said carrier wave.

5. The fluid height measuring system of claim 1, wherein said radio frequency energy is electromagnetic energy.

6. The fluid height measuring system of claim 1, wherein each of the receiving means of said plurality of receiving means comprises:
a receiving means effectively connected to that portion of the aforesaid elongated support means that is submerged within said fluid; and
a predetermined receiving transducer means connected to the input of said receiving means in such manner that it, too, is submerged within said fluid.

7. The fluid height measuring system of claim 1, wherein each of the receiving means of said plurality of receiving means comprises:
a receiving transducer means effectively mounted on that portion of said elongated support means that is submerged within said fluid; and
a predetermined receiving transducer means connected to the output of said receiving transducer means and effectively mounted on that portion of said elongated support means that extends out of said fluid.

8. The fluid height measuring means of claim 1, further characterized by means spatially disposed from said elongated support means for remotely receiving and processing the radio frequency energy indicated by the aforesaid indicating means in terms of an analog signal representing the height of said fluid at any given instant that may be read out thereat.

9. The fluid height measuring system of claim 1, wherein the fluid whose height is being measured is water.

10. A system for sensing water height and wave conditions at the surface of a body of water having determinable attenuation characteristics for radio frequency electromagnetic energy signals, said system comprising:
an elongated, substantially vertical staff extending above and below said surface and having a medial zone subjected to varying coverage by said water in accordance with said wave conditions;
radio transmitter means, including a transmitting antenna mounted on said staff at a location above said medial zone, for directing radio frequency energy having a plurality of different signal frequencies downwardly into said body of water;
radio receiving means, including a plurality of receiving antennas, each tuned to a different one of said signal frequencies and spaced at different elevations along said medial zone so as to be sequentially and progressively covered and uncovered as water height increases and decreases relative to said staff, for sensing variations in attenuation of said radio frequency signals as a function of said wave conditions and due to the distances said signals travel through said water to reach said receiving antennas; and
read out means, connected to said receiver means, for providing electrical analog output signals representative of said wave conditions.

11. A system as defined in claim 10, and further characterized by:
said receiving antennas extending radially from said staff and arranged about the circumference thereof so as to define a helical array.

* * * * *